Sept. 13, 1960 B. G. WALKER 2,952,745

VIDEO RECORDER AND REPRODUCER

Filed Feb. 28, 1956 2 Sheets-Sheet 1

INVENTOR:
BENJAMIN G. WALKER,
BY Nathan [signature]
HIS ATTORNEY.

FIG. 2.
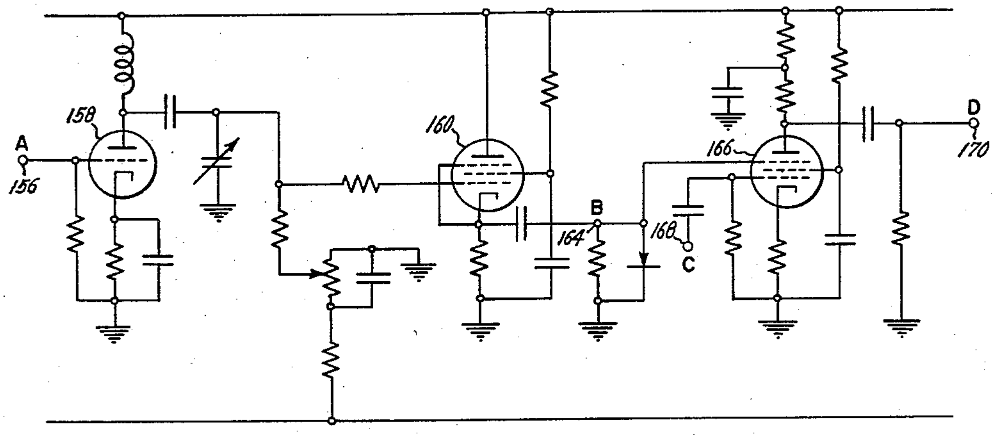
FIG. 3.
FIG. 3, FIG. 4.
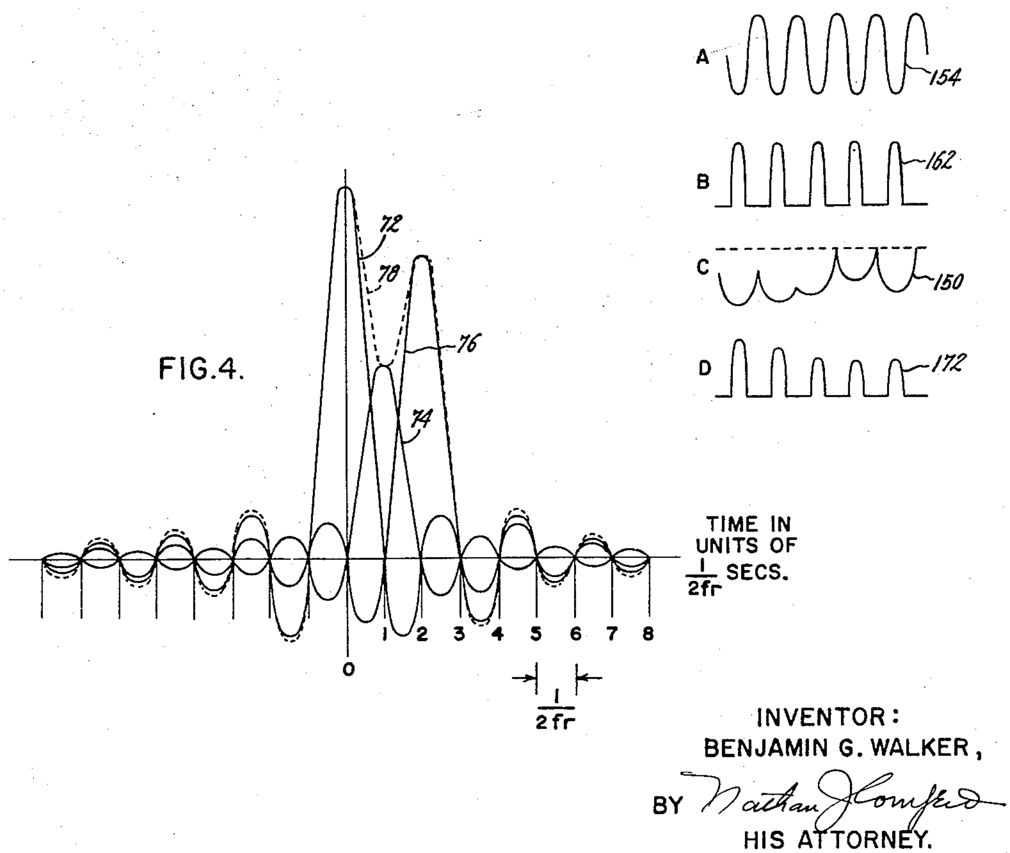
INVENTOR:
BENJAMIN G. WALKER,
BY Nathan J. Cornfeld
HIS ATTORNEY.

2,952,745

VIDEO RECORDER AND REPRODUCER

Benjamin G. Walker, Syracuse, N.Y., assignor to General Electric Company, a corporation of New York Filed Feb. 28, 1956, Ser. No. 568,217

7 Claims. (Cl. 179—100.2)

This invention relates to systems for recording and reproducing wide band signals such as television video signals. The invention is an improvement over the system described in the copending application of Leonard C. Maier et al., Serial Number 567,581, filed February 24, 1956, entitled "Video Tape Recording System" and assigned to the assignee of this application.

In the system described in the above mentioned Maier et al., application, the signal to be recorded is multiplexed by sampling its amplitude with narrow pulses at a frequency at least twice that of its highest frequency component and the samples are distributed sequentially among a plurality of recording channels each having an upper frequency limit or bandwidth $f_r$. For maximum economy of bandwidth in each channel the pulses are converted to wave trains of the form $$\frac{\sin 2\pi f_r t}{2\pi f_r t}$$

where $f_r$ is one half the pulse repetition rate in each channel, $f_c$. The channel bandwidth $f_r$ thus determines the number of recording channels required according to the expression $$n=\frac{f_s}{f_r}$$

where $n$ is the number of channels and $f_s$ is the highest frequency component of the signal to be recorded. The resulting wave trains from the several channels are then recorded on respective tracks of a plural track magnetic tape or other suitable storage medium. Upon playback the reproduced signals are subjected to a demultiplexing process in which the wave trains are reconverted to pulses by sampling the amplitude of the reproduced signals in each channel at times corresponding to the amplitude peaks of the original wave trains. The pulses in the several channels are then combined in the same sequence as they were originally to make a composite pulse train the amplitude profile of which defines the waveform of the original wide band signal. The wide band signal is then reconstituted by filtering the composite pulse train.

While the above described recording and reproducing system has many advantages, optimum reproduction of wide band signals is sometimes interfered with by spurious signals developed in the demultiplexing process. Development of these spurious signals appears to be due largely to the fact that during playback the sampling process for each channel is performed in a separate circuit. As a result of small differences in the characteristics of the components of these separate circuits, small differences in shape and timing exist among the sample pulses from the different playback channels, and these small discrepancies cause timing errors in the demultiplexer sampling which produce the spurious signals in the output of the demultiplexer. The spurious signals thus produced are repetitive at the channel sampling frequency, $f_c$, and integral multiples thereof. Such spurious signals may cause objectionable distortion of the reconstituted wide band input signal.

Accordingly, a principal object of the present invention is to provide an improved recording and reproducing system for wide band signals in which the foregoing difficulties are overcome.

Another object is to provide an improved recording and reproducing system for wide band signals employing time sample multiplexing, plural channel recording and reproducing, and time sample demultiplexing, and wherein development of spurious output signals in the demultiplexing process is minimized.

Another object is to provide an improved system for reproducing wide band signals recorded in plural channels by time sample multiplexing, the reproducing system employing time sample demultiplexing and having means for insuring precision uniformity in shape and timing of the demultiplexed time samples.

These and other objects of my invention will be apparent from the following description, and the scope of the invention will be defined in the appended claims.

Briefly, the present invention provides for the resampling of the composite pulse train formed by combining the pulse sample outputs of the plural demultiplexer channels, the resampling being performed at the frequency of the pulses in the composite train and by means of a single or common resampling circuit. The common resampling circuit insures exact uniformity in width and timing of the samples constituting its output, and thus provides a new set of precision pulse samples of uniform width, free from timing errors and modulated only in height according to the amplitude profile of the original wide band signal. From this new set of precision samples the wide band signal is then reconstituted with substantially reduced distortions due to spurious signals.

In the drawings,

Figure 2 is a schematic diagram of the resampler portion of the system shown in Figure 1, Figure 3 is a graphical representation of waveforms at various points in the circuit of Figure 2, and Figure 4 is a graph of additional waveforms associated with the system of this invention.

Figure 1:
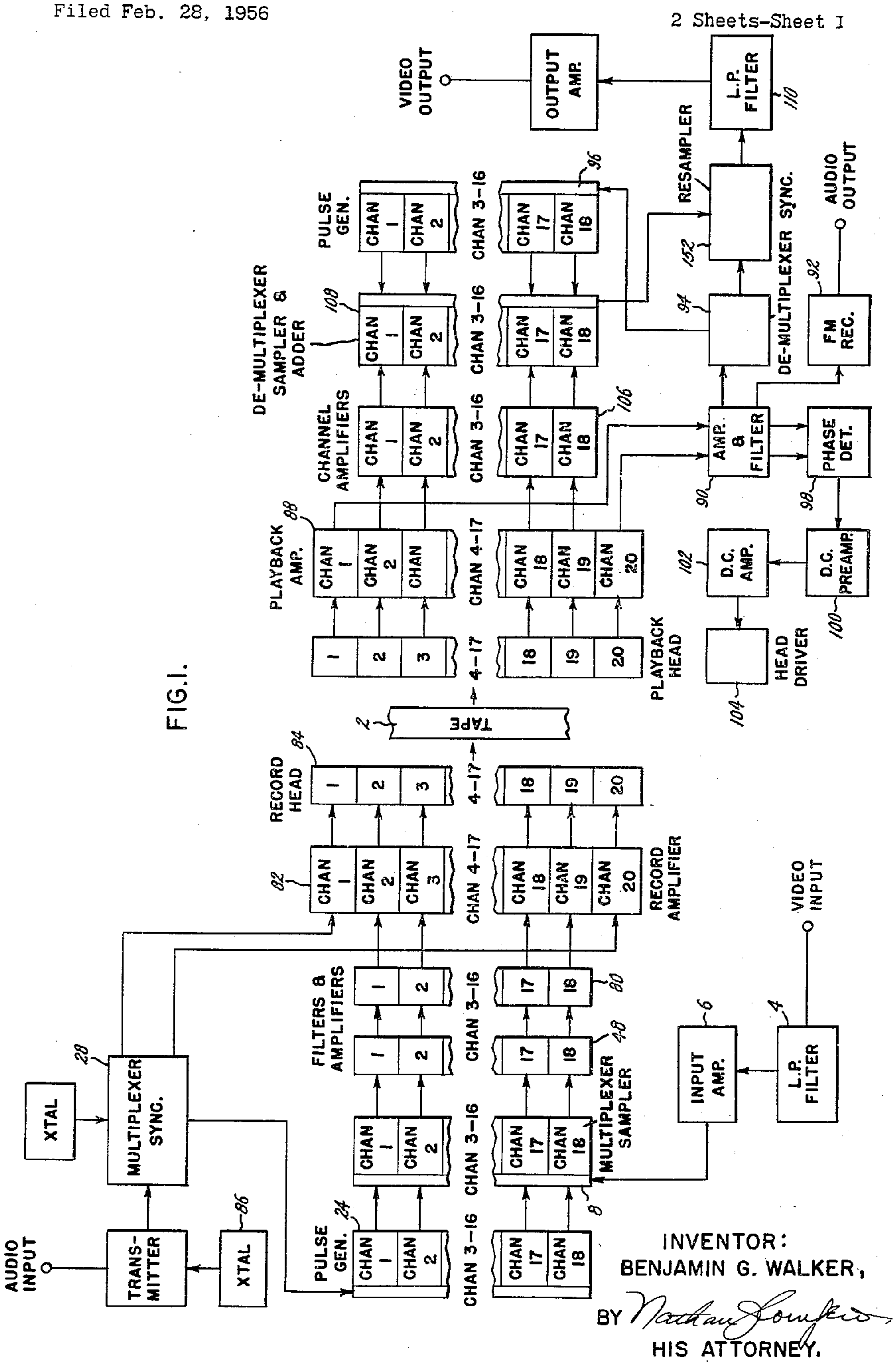
Figure 1 is a block diagram of a wide band recording and reproducing system constructed in accordance with the present invention.

Turning now to Figure 1, to facilitate an understanding of the recording and reproducing system there shown, its operation will be explained in connection with the recording and reproducing of a video signal having a bandwidth or frequency spectrum, 0 to $f_s$, of 3.4 mcs. It should be understood that this specific bandwidth is exemplary only, the invention being in no sense limited to the handling of any specific bandwidth.

According to Shannon's sampling theorem, correct reproduction of a 3.4 mc. signal from samples of its amplitude requires that it be sampled at a frequency not less than 6.8 mcs., i.e. at time intervals of .147 microsecond. The system uses a recording medium in the form of a magnetic tape 2 having a plurality of channels or tracks, of which all but two are used to record the components of the video signal and the remainder are used for synchronizing and control purposes and to record accompanying audio signals, if any. The bandwidth of each tape channel is $f_r$=189 kc. Since as previously explained the number of channels, $n$, required to record the video signal equals $$\frac{f_s}{f_r}$$

in the system shown $n$ is therefore eighteen and the total number of tape channels required is twenty. Since the system has eighteen sample channels the recurrence frequency of the samples in each channel, $f_c$, will be 1/18 of 6.8 megacycles or 378 kilocycles, i.e. a period of 2.65 microseconds. To minimize loss in system frequency response it is preferable to keep the sample pulse width as small as practical, sample pulse widths of the order of 0.1 microsecond being preferred.

The input video signal enters the system through a low pass filter 4 which eliminates frequency components higher than $f_s$, and is then fed through a video amplifier 6 to the eighteen channel multiplexer sampler 8. In the multiplexer sampler the amplitude of the video signal is sampled at intervals of $$\frac{1}{2f_s}$$

seconds and the samples are distributed sequentially among the eighteen recorder channels. The multiplexer sampler is timed by 0.1 microsecond gating pulses having a 6.8 mc. frequency generated in pulse generator 24 under the control of multiplexer synchronizer 28 and distributed sequentially to the eighteen channels of the sampler. Each channel of the sampler thus produces samples at a frequency $f_c$ of 378 kc. in coincidence with the pulses from pulse generator 24 and having a height determined by the amplitude of the video signal during the sampling period.

The pulses from each channel of the sampler are converted to wave trains of the form $$\frac{\sin 2\pi f_r t}{2\pi f_r t}$$

where $f_r$ is one half the pulse repetition rate, $f_c$, in each channel. This conversion is accomplished in each channel by means of a filter 48 which is even ringing, i.e. has an output waveform as shown in Figure 4 passing through zero at regular equal intervals of time $$\frac{1}{2f_r}$$

seconds in length, and which preferably has a substantially flat amplitude and linear phase characteristic over the frequency band from zero to $f_r$. In Figure 4, waveform 72 represents the response of a filter 48 to a first pulse, waveform 74 its response to a second pulse, waveform 76 its response to a third pulse, and waveform 78 the composite output of the filter. It will be apparent from Figure 4 that at each of the times 0

$$\frac{1}{2f_r}, \frac{2}{2f_r}, \text{etc.}$$

the filter output has an amplitude which is exclusively a function of a particular input pulse, amplitude, and entirely unaffected by the preceding or succeeding pulses. The resulting output signals from filters 48 of the several channels are then amplified in multi-channel amplifier 80. Each channel of amplifier 80 includes a time delay equalization network (not shown), capable of introducing a delay sufficient to compensate for small differences in the time delay characteristics among the filters 48. These time delay correction networks also compensate for other interchannel transmission time differences so that the overall transmission time for all the channels is the same. The output signals from amplifier 80 are then further amplified to a level suitable for recording by the record amplifiers 82 and are supplied to the multi-channel recording head 84 for recording on the inner eighteen tracks of the twenty track magnetic tape.

The two outside tracks of the tape are reserved for control and synchronization signals and for any audio intelligence which it is desired to record with the video, such as for example the sound signal associated with a television video signal. The audio signal is applied to channel 1 in the form of frequency modulation of a carrier generated by a crystal-controlled oscillator 86. The carrier is utilized to avoid the poor low frequency response of the tape at speeds necessary to record the filter output signals. For the purpose of synchronizing the demultiplexing operation, a timing signal having a frequency less than $f_r$ and equal to a subharmonic of $f_s$ is supplied by the multiplexer synchronizer 28 and recorded in track 20 with its phase adjusted so that it goes through zero at the time that one channel should be sampled. For the purpose of minimizing interchannel timing errors due to skewing of the tape 2 relative to the record and playback heads, the multiplexer synchronizer 28 also supplies a low frequency control signal which is recorded with a 90° phase separation in tracks 1 and 20, and upon reproduction is used to servo control the angular position of the playback heads.

Upon reproduction the signals from all the tracks of the tape are amplified in the playback amplifier 88. From the playback amplifier the timing, servo control, and audio signals are fed to amplifier filter 90 wherein the audio signal is separated and fed to the FM receiver 92. The timing signal is fed to a demultiplexer synchronizer 94 where it is utilized to derive a synchronizing signal for controlling the timing of the demultiplexer pulse generator 96. The low frequency control signals from the two outside channels are recovered in the filter amplifier 90 and fed to a phase detector 98 wherein they are used to generate a skew error signal permitting servo control of the angular position of the playback head relative to the tape.

The phase detector 98 is arranged to provide a null output if the two input signals have a 90° phase difference. Since the two control signals were originally recorded on tape tracks 1 and 20 with a 90° phase difference, a 90° phase difference at the phase detector 98 will provide an indication that the playback head is properly aligned with the tape and there is no skew. If the playback head is skewed relative to the tape, the control signals will have a phase difference other than 90°, the deviation from 90° depending upon the magnitude of the skew error and the polarity of the deviation depending upon the direction of the skew error. Accordingly the output of the phase detector will be a voltage whose polarity and magnitude are proportional to the skew of the playback head. The output of the phase detector is amplified in D.C. pre-amplifier 100 and amplifier 102 and fed to an electro-magnetic driving device 104 which is mechanically attached to the playback head so as to rotate the head relative to the tape in such a direction as to eliminate the skew error. Such a skew control servo system is the subject of a separate patent application in the names of Samuel M. Garber, Jr., Thomas T. True, and Benjamin G. Walker, filed February 13, 1956, Serial Number 565,062, and assigned to the assignee of this application, to which reference is made for a more complete disclosure.

The 189 kilocycle signals recovered from channels 2 through 19 of the playback amplifier are further amplified in multichannel amplifier 106 and fed to the demultiplexer sampler and adder 108. The sampling circuits used in the demultiplexer sampler are essentially the same as those used in the mutiplexer sampler 8 heretofore described. Timing of the sampling in the demultiplexer sampler is controlled by the pulses from the pulse generator 96 which is in turn timed by the synchronizing signal output of the demultiplexer synchronizer 94. Thus the signal arriving at each channel of the demultiplexer sampler will be sampled at intervals of $$\frac{1}{2f_r}$$

and at times substantially corresponding to the amplitude peaks of the responses of the corresponding even ringing filter 48, i.e. at times corresponding to $t=0$ $$\frac{1}{2f_r}, \frac{2}{2f_r}, \text{ etc. seconds in Figure 4}$$

In this way the amplitude of the corresponding sample pulses applied to the even ringing filter 48 in the corresponding recorder channel, and intersample cross talk is minimized.

The outputs of the individual channel samplers are added in a common load, the output signal appearing across the load thus consisting of a composite pulse train consisting of the samples from all the channels arranged in proper sequence.

From the adder the composite pulse train, as represented by waveform 150 in Figure 3, is fed to the resampler 152. The function of the resampler according to the present invention is to derive a fresh train of pulses having an amplitude profile corresponding to the profile of the peaks of the pulses in wavetrain 150 but consisting of pulses whose width is uniform and whose spacing is uniform within very close tolerances.

The detailed circuit of the resampler 152 is shown in Figure 2. The resampler receives from the demultiplexer synchronizer 94 a 6.8 megacycle sinewave synchronized with the timing signal supplied to pulse generator 96. This 6.8 megacycle signal, represented by waveform 154 in Figure 3, appears at terminal 156 in Figure 2 and is converted in amplifier 158 and cathode follower 160 to 6.8 mc. positive pulses having a width preferably much narrower than the samples comprising waveform 150, the resampling pulses being in the system shown of the order of .07 microsecond. The positive pulses, as shown by waveform 162 in Figure 3, appear at point 164 in Figure 2 from which they are applied to the suppressor grid of a pentode sampling or gating tube 166. The composite pulse train from the adder, waveform 150 in Figure 3, is connected to point 168 in Figure 2 and applied to the control grid of sampling tube 166. The output of the sampling tube appears in the plate circuit and is recovered at point 170 in Figure 2. This output is illustrated by waveform 172 in Figure 3. Since the resampling pulses as illustrated by waveform 162 are considerably narrower than the individual pulses of the train derived from the adder as illustrated by waveform 150, the resampling pulses alone determine the width and timing of the final precision sample pulses shown in waveform 172, and all discrepancies in shape and timing of the samples in wave train 150 are of no effect on the form of wave train 172. Since all of the samples comprising waveform 150 are resampled by one common circuit, the precision sample pulses as shown by waveform 172 are precisely uniform in width and time spacing while being modulated in amplitude according to the amplitude profile of the composite pulse train derived in the adder.

From the resampler the precision sample train illustrated by waveform 172 is passed through a low pass filter 110 having an upper cutoff frequency $f_s$ i.e. 3.4 megacycles. The filter integrates the samples and the original video signal is thereby reconstituted substantially free of spurious signals from the demultiplexer.

Thus there has been shown and described an improved system for recording and reproducing wide band signals employing time sample multiplexing, plural channel recording and reproducing, and time sample demultiplexing, wherein spurious output signals are eliminated by the technique of precision resampling of the demultiplexer output. The resampling step is simple but effective, and provides a substantial improvement in overall system performance.

It will be appreciated by those skilled in the art that the invention may be carried out in various ways and may take various forms and embodiments other than those illustrative embodiments heretofore described. It is to be understood therefore that the scope of the invention is not limited by the details of the foregoing description, but will be defined in the following claims.

What I claim as new and desire to secure by Letters Patent of the United States is:

1. Apparatus for recording and reproducing a wave signal having frequency components extending over a broad band of frequencies comprising means for generating pulses corresponding in amplitude to the simultaneous amplitude of the wave signal and having a sampling frequency equal to at least twice that of the highest frequency component of the wave signal, means for distributing the generated pulses sequentially among a plurality of signal channels, means for converting each pulse to a wave of the form $$\frac{\sin 2\pi f_r t}{2\pi f_r t}$$

where $f_r$ equals one half of the repetition rate of the pulses in each channel, means for recording the waves thus produced in a plurality of signal storage channels, means for reproducing the recorded signals, means for sampling the reproduced signals at times corresponding to the amplitude peaks of the recorded waves, means for combining the samples of the reproduced signals to form a composite sample train, means for deriving precision amplitude samples from the composite sample train at times corresponding to the amplitude peaks of the recorded waves, said precision samples having uniform spacing and frequency equal to said sampling frequency and having a uniform width narrower than the width of the samples in the composite sample train, and means for reconstituting the original wave signal from the precision samples.

2. Apparatus for recording and reproducing a wide band signal comprising means for generating pulses having a frequency twice that of the highest frequency component, $f_s$, of the wide band signal and corresponding in amplitude to the simultaneous amplitude of the wide band signal, means for distributing the pulses sequentially among a plurality, $n$, of recording channels, means for converting each pulse in each channel to a signal substantially of the form $$\frac{\sin 2\pi f_r t}{2\pi f_r t}$$

where $f_r$ is equal to $$\frac{f_s}{n}$$

means for recording the signals thus generated in $n$ respective signal storage channels, means for reproducing the recorded signals from each channel, means for sampling the reproduced signals from each channel at the frequency $2f_r$ and at times corresponding to the peak amplitudes of the recorded signals to form samples corresponding in frequency and amplitude to the pulses in each recording channel, means for combining the samples of the reproduced signals in sequence to form a composite sample train having an amplitude profile corresponding to the waveform of the original wide band signal, means for resampling the composite sample train at the frequency $2f_s$ and at times corresponding to the peak amplitudes of the recorded signals to form precision samples, and means for filtering the precision sample train thus formed to reproduce the original wide band signal.

3. Apparatus for recording and reproducing a wide band signal comprising recorder sampling means for deriving amplitude samples of the wide band signal at a frequency having a predetermined relation to that of the highest frequency component of the wide band signal, a plurality of recording channels, means for distributing said amplitude samples in a predetermined order among the recording channels, means in each channel for deriving from successive samples therein waves each having a peak amplitude corresponding to the amplitude of a respective sample and having substantially zero amplitude during the occurrence of peaks of preceding and succeeding waves, plural channel signal storage means for recording the derived wave signals, a plural channel reproducer for recovering the recorded wave signals, playback sampling means synchronized with the recorder sampling means for deriving amplitude samples of the reproduced signals at times corresponding to the amplitude peaks of the recorded wave signals, means for combining the samples of the reproduced signals according to said predetermined order to form a composite sample train, means synchronized with the recorder sampling means for resampling the composite sample train at the frequency of the amplitude samples of the wide band signal and at times corresponding to the amplitude peaks of said recorded wave signals to form precision samples, and means for reconstituting the original wide band signal from the precision sample train.

4. Apparatus for reproducing a wide band signal from a storage medium having a plurality of signal storage channels containing stored signals each consisting of waves derived from pulse amplitude samples of the wide band signal distributed in a predetermined order, each of said waves having an amplitude peak corresponding in amplitude and time to a respective pulse amplitude sample, said apparatus comprising plural channel playback means for recovering the stored signals, means synchronized with the stored signals for deriving amplitude samples of the stored signals at times corresponding to the amplitude peaks of said waves, means for combining the derived samples according to said predetermined order to form a composite sample train, a common resampler for resampling all the samples of the composite sample train at the frequency of said pulse amplitude samples and at times corresponding to the amplitude peaks of said waves, and means for reconstituting the wide band signal from the output of the common resampler.

5. In apparatus for reproducing a wide band signal from a storage medium having a plurality of signal storage channels contained stored signals each consisting of waves derived from pulse amplitude samples of the wideband signal distributed in a predetermined order, said apparatus including plural channel playback means for recovering the stored signals, means for demultiplexing the recovered signals to reconstitute the original wideband signal comprising means synchronized with the stored signals for derivng amplitude samples thereof at times corresponding to the amplitude peaks of said waves, means for combining the derived samples according to said predetermined order to form a composite sample train, a resampler for resampling all the samples of the composite sample train at the frequency of said pulse amplitude samples, and at times corresponding to the amplitude peaks of said waves, and means for reconstituting the wide band signal from the output of the resampler.

6. Apparatus for reproducing a wide band signal from a storage medium having a plurality of signal storage channels containing stored signals derived from pulse amplitude samples of the wide band signal, each of said stored signals comprising waves having amplitude peaks corresponding in amplitude and time to respective pulse amplitude samples, said apparatus comprising plural channel playback means for recovering the stored signals, means synchronized with the stored signals for deriving amplitude samples of the stored signals at times corresponding to the amplitude peaks of the waves thereof, means for combining the derived samples to form a composite sample train corresponding to the pulse amplitude samples of the wide band signal, a common resampler for deriving precision amplitude samples from the composite sample train at times corresponding to the amplitude peaks of said waves, said precision samples having uniform spacing and a frequency equal to that of said pulse amplitude samples and having a uniform width narrower than the samples of said composite train, and a filter for reconstituting the wide band signal from said precision sample train.

7. Appartus for recording and reproducing a wide band signal comprising recorder sampling means for deriving amplitude samples of the wide band signal at a frequency not less than twice that of the highest frequency component of the wide band signal, a plurality of recording channels, means for distributing the samples sequentially amoung the recordnig channels, an even ringing filter in each channel having a substantially flat amplitude and linear phase characteristic over the frequency band from zero to not less than one-half the channel sample repetition frequency, whereby from each of said samples is derived a wave having a peak amplitude corresponding to the sample amplitude, plural channel signal storage means for recording the derived wave signals, a plural channel reporducer for recovering the recorded signals, playback sampling means synchronized with the recorder sampling means for deriving amplitude samples of the recovered signals at times corresponding to the amplitude peaks of the waves derived by said filters, means for combining the samples of the recovered signals in sequence to form a composite sample train, a common resampler synchronized with said recorder sampling means for deriving precision amplitude samples of the composite sample train at times corresponding to the amplitude peaks of the waves derived by said filter, said precision samples having uniform spacing and a frequency equal to that of the samples derived by said recorder sampling means and having a uniform width narrower than the samples of said composite train, and integrating means for reconstituting the original wide band signal from the precision sample train.

References Cited in the file of this patent

UNITED STATES PATENTS

| | | |
|---|---|---|
| 2,517,808 | Sziklai | Aug. 8, 1950 |
| 2,600,561 | Meacham | June 17, 1952 |
| 2,694,748 | Johnson | Nov. 16, 1954 |
| 2,695,331 | Johnson | Nov. 23, 1954 |